United States Patent
Chen et al.

(10) Patent No.: US 12,283,908 B2
(45) Date of Patent: Apr. 22, 2025

(54) MOTOR DRIVER HAVING TEMPERATURE SENSING MECHANISM

(71) Applicant: ANPEC ELECTRONICS CORPORATION, Hsinchu (TW)

(72) Inventors: Kun-Min Chen, Hsinchu (TW); Huan-Chieh Chou, Taoyuan (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 147 days.

(21) Appl. No.: 18/184,815

(22) Filed: Mar. 16, 2023

(65) Prior Publication Data

US 2024/0243688 A1     Jul. 18, 2024

(30) Foreign Application Priority Data

Jan. 12, 2023   (TW) ................. 112101277

(51) Int. Cl.
  *H02P 27/08*   (2006.01)
  *H02P 29/68*   (2016.01)

(52) U.S. Cl.
  CPC ............ *H02P 29/68* (2016.02); *H02P 27/085* (2013.01)

(58) Field of Classification Search
  CPC ........ H02P 29/68; H02P 27/085; H02P 29/60; H02P 29/024
  See application file for complete search history.

(56) References Cited

U.S. PATENT DOCUMENTS

| | | |
|---|---|---|
| 8,089,235 B2 | 1/2012 | Morino et al. |
| 10,348,228 B1 * | 7/2019 | Yang .................... H02P 6/28 |
| 2011/0234129 A1 * | 9/2011 | Shimizu ................ H02P 6/12 |
| | | 318/400.04 |
| 2016/0261215 A1 * | 9/2016 | Ishii ....................... H03K 5/153 |

* cited by examiner

*Primary Examiner* — Muhammad S Islam
(74) *Attorney, Agent, or Firm* — Li & Cai Intellectual Property (USA) Office

(57) ABSTRACT

A motor driver having a temperature sensing mechanism is provided. A control circuit determines a time for outputting a controlling signal according to a pulse-width modulation signal received from an external pulse-width modulation circuit. A driving circuit outputs a driving signal according to the controlling signal. An output stage circuit operates according to the driving signal to output an output stage signal to a motor to drive the motor to rotate. In a temperature sensing mode, a thermal sensor circuit senses a temperature inside the motor driver to output a temperature sensing signal. An external system circuit determines whether or not the motor driver causes overheating to the motor when being adapted to the motor according to the temperature sensing signal, and evaluates whether or not the motor driver is applicable to the motor.

15 Claims, 8 Drawing Sheets

MOTOR DRIVER HAVING TEMPERATURE SENSING MECHANISM

CROSS-REFERENCE TO RELATED PATENT APPLICATION

This application claims the benefit of priority to Taiwan Patent Application No. 112101277, filed on Jan. 12, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver having a temperature sensing mechanism.

BACKGROUND OF THE DISCLOSURE

In electronic devices, fans are used to cool other heat generating components such as processors in the electronic devices. In order to enable the fan to cool the heat generating components rapidly, in conventional motor drivers, a driver circuit provides a high duty ratio high-side on-state signal to a high-side switch so that the high-side switch is switched on for a long period of time, thereby allowing more current to flow through the high-side switch to the fan motor for rapid rotation of the fan motor.

However, when a conventional motor driver drives a fan motor to rotate rapidly for a long period of time, due to a large amount of current flowing through the upper bridge switch and other circuit components in the conventional motor driver to the motor, the circuit components of the conventional motor driver may be damaged due to overheating from the rapid increase in temperature increase over the long period of operation.

SUMMARY OF THE DISCLOSURE

In response to the above-referenced technical inadequacy, the present disclosure provides a motor driver having a temperature sensing mechanism. The motor driver includes a motor driving circuit and a thermal sensor circuit. The motor driving circuit includes a control circuit, a driving circuit, and an output stage circuit. The control circuit is configured to determine a time for outputting a controlling signal according to a pulse-width modulation signal received from an external pulse-width modulation circuit connected to the control circuit. The driving circuit is connected to the control circuit. The driving circuit is configured to output a driving signal according to the controlling signal received from the control circuit. The output stage circuit is connected to the driving circuit and a motor. The output stage circuit is configured to operate according to the driving signal received from the driving circuit to output an output stage signal to the motor to drive the motor to rotate. The thermal sensor circuit is disposed adjacent to the motor driving circuit. The thermal sensor circuit is configured to sense a temperature inside the motor driver to output a temperature sensing signal.

In certain embodiments, the control circuit receives the pulse-width modulation signal from the external pulse-width modulation circuit through one of a plurality of pins of the motor driver. The thermal sensor circuit outputs the temperature sensing signal to an external system circuit through another one of the plurality of pins of the motor driver.

In certain embodiments, the control circuit receives the pulse-width modulation signal from the external pulse-width modulation circuit and the thermal sensor circuit outputs the temperature sensing signal to an external system circuit through one of a plurality of pins of the motor driver.

In certain embodiments, the motor driver further includes a detection circuit. The detection circuit is connected to the thermal sensor circuit. The detection circuit is configured to detect the pulse-width modulation signal received from the external pulse-width modulation circuit to determine whether or not the motor driver enters a temperature sensing mode to output a mode detecting signal. The thermal sensor circuit determines whether or not to sense the temperature inside the motor driver according to the mode detecting signal.

In certain embodiments, the control circuit and the detection circuit receive the pulse-width modulation signal from the external pulse-width modulation circuit through one of a plurality of pins of the motor driver.

In certain embodiments, when the detection circuit detects that a plurality of non-duty cycles of a designated number in a plurality of waveforms of the pulse-width modulation signal are respectively equal to a plurality of reference duty cycles, the detection circuit determines that the motor driver enters the temperature sensing mode.

In certain embodiments, when the detection circuit detects that a plurality of frequencies of a designated number in a plurality of waveforms of the pulse-width modulation signal are respectively equal to a plurality of reference frequencies, the detection circuit determines that the motor driver enters the temperature sensing mode.

In certain embodiments, the motor driver further includes a frequency generating circuit. The frequency generating circuit is configured to determine a frequency of the controlling signal output by the control circuit connected to the frequency generating circuit to output a frequency signal to an external system circuit, or output another frequency signal to the driving circuit connected to the frequency generating circuit.

In certain embodiments, the frequency generating circuit outputs the frequency signal to the external system circuit and the thermal sensor circuit outputs the temperature sensing signal to the external system circuit through one of a plurality of pins of the motor driver.

In certain embodiments, the motor driver further includes an analog-to-digital converter circuit. The analog-to-digital converter circuit is connected to the thermal sensor circuit. The analog-to-digital converter circuit is configured to convert the temperature sensing signal that is an analog signal into a digital signal to be taken as a digital temperature sensing signal.

In certain embodiments, the motor driver further includes a communication component. The communication component is connected to the analog-to-digital converter circuit. The communication component is configured to transmit the digital temperature sensing signal generated by the analog-to-digital converter circuit to an external system circuit.

In certain embodiments, the motor driver further includes a storing circuit. The storing circuit is connected to the analog-to-digital converter circuit and the communication component. The storing circuit is configured to store the digital temperature sensing signal generated by the analog-to-digital converter circuit. The communication component transmits the digital temperature sensing signal stored by the storing circuit to the external system circuit.

In certain embodiments, the control circuit receives the pulse-width modulation signal from the external pulse-width modulation circuit and the communication component transmits the digital temperature sensing signal to the external system circuit through one of a plurality of pins of the motor driver.

In certain embodiments, the control circuit receives the pulse-width modulation signal from the external pulse-width modulation circuit through one of a plurality of pins of the motor driver. The communication component transmits the digital temperature sensing signal to the external system circuit through another one of the plurality of pins of the motor driver.

In certain embodiments, the thermal sensor circuit includes a current source and a temperature change component. The current source provides an input current to the temperature change component for allowing the temperature change component to operate. The temperature change component senses the temperature inside the motor driver and outputs parameters of the temperature sensing signal that change along with changes in the temperature.

In certain embodiments, the temperature change component includes a diode having a voltage that changes along with changes in the temperature, or a thermistor having a resistance that changes along with changes in the temperature.

In certain embodiments, the motor driver further includes a rotor position sensor circuit. The rotor position sensor circuit is connected to the control circuit. The rotor position sensor circuit is configured to detect a position of a rotor of the motor to output a position detection signal to the control circuit. The control circuit determines a signal content of the controlling signal output to the driving circuit according to the position detection signal.

As described above, the present disclosure provides the motor driver having a temperature sensing mechanism. When the motor driver drives the motor to rotate in different rotational speeds, the motor driver senses temperatures of electrical components in the motor driver or surrounding regions thereof to provide the temperatures to the external system circuit for determining whether or not an overheating has occurred in the motor driver. Specifically, when the motor driver drives the motor to maintain rotation at a maximum speed, the external system circuit determines whether or not a temperature of the motor driver that is sensed exceeds a temperature that the motor driver can tolerate, so as to evaluate whether or not the motor driver (and the driving performed by the motor driver on the motor) is applicable to the motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
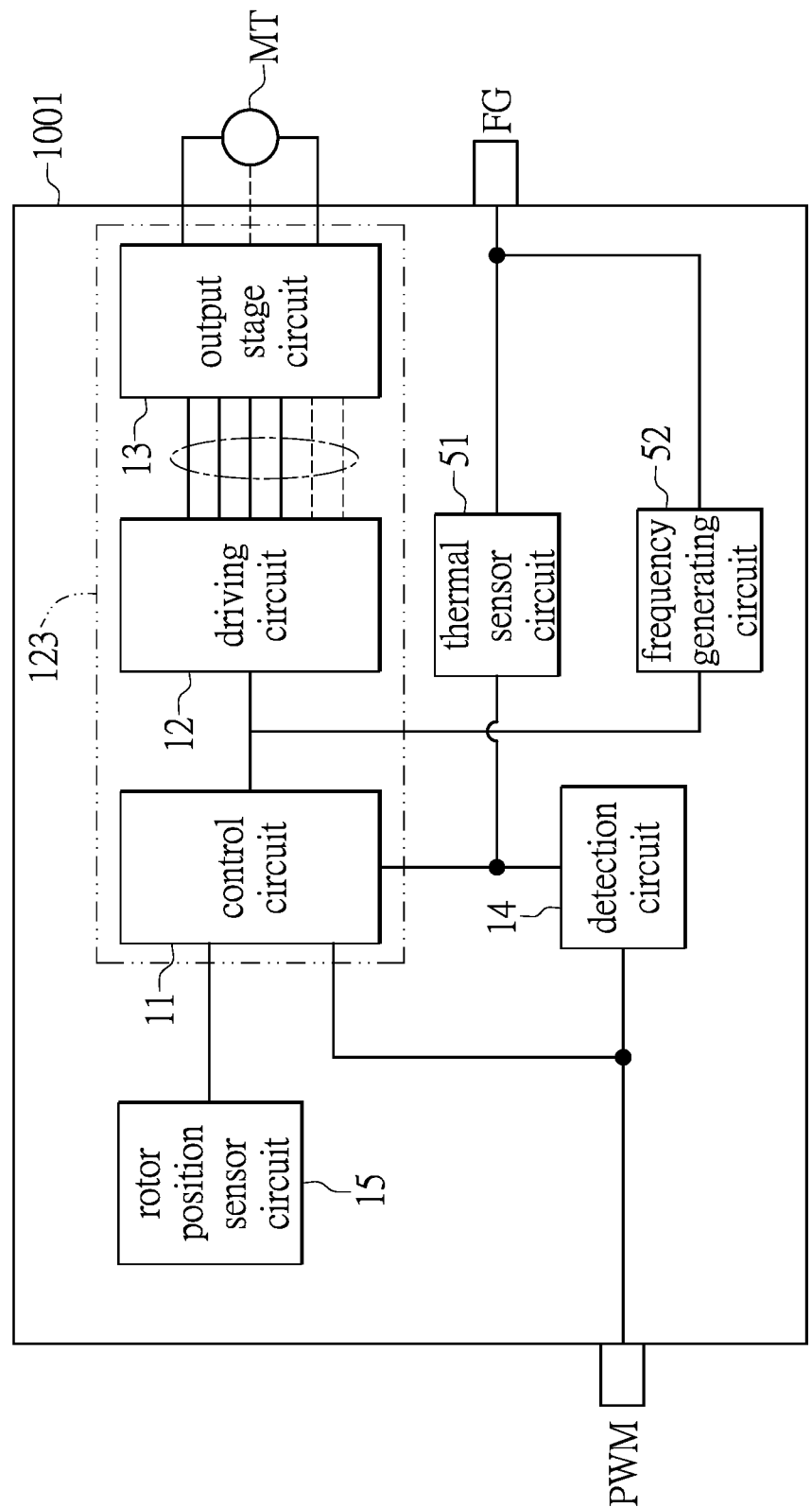
FIG. 1 is a functional block diagram of a motor driver having a temperature sensing mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, in which FIG. 1 is a functional block diagram of a motor driver having a temperature sensing mechanism according to a first embodiment of the present disclosure.

A motor driver 1001 of the first embodiment of the present disclosure includes a motor driving circuit 123 and a thermal sensor circuit 51. The thermal sensor circuit 51 is disposed inside the motor driver 1001, and may be disposed adjacent to the motor driving circuit 123. The motor driving circuit 123 may include a control circuit 11, a driving circuit 12, and an output stage circuit 13. If necessary, the motor driver 1001 of the first embodiment of the present disclosure may further include one or more of the following: a detection circuit 14, a frequency generating circuit 52, and a rotor position sensor circuit 15.

The rotor position sensor circuit 15 may be disposed on a motor MT or adjacent to the motor MT, and may be connected to the control circuit 11. The control circuit 11 is connected to the driving circuit 12. The driving circuit 12 is connected to the output stage circuit 13. The output stage circuit 13 is connected to the motor MT. The detection circuit 14 is connected to the thermal sensor circuit 51. The frequency generating circuit 52 is connected to an output terminal of the control circuit 11 or an input terminal of the driving circuit 12.

The rotor position sensor circuit 15 may detect a position of a rotor of the motor MT to output a position detection signal. The control circuit 11 may determine a signal content of the controlling signal output to the driving circuit 12 according to the position detection signal received from the rotor position sensor circuit 15.

The control circuit 11 receives a pulse-width modulation signal from an external pulse-width modulation circuit connected to the control circuit (through one of a plurality of pins of the motor driver 1001 such as, but not limited to, a pin PWM). The control circuit 11 determines a time for outputting a controlling signal to the driving circuit 12 according to the pulse-width modulation signal.

The driving circuit 12 outputs one or more driving signals according to the controlling signal received from the control circuit 11. The output stage circuit 13 operates according to the driving signal received from the driving circuit 12 to output one or more output stage signals to the motor MT to drive the motor MT to rotate.

It should be noted that, when the motor driving circuit 123 drives the motor MT to rotate, the thermal sensor circuit 51 senses a temperature inside the motor driver 1001 to generate a temperature sensing signal. The thermal sensor circuit 51 may output the temperature sensing signal to an external system circuit through one of the plurality of pins of the motor driver 1001 such as, but not limited to, a pin FG.

The thermal sensor circuit 51 of the motor driver 1001 of the first embodiment of the present disclosure may sense the temperature inside the motor driver 1001 only at designated times.

First, the control circuit 11 and the detection circuit 14 both receive the pulse-width modulation signal from the external pulse-width modulation circuit through one of the plurality of pins of the motor driver 1001, such as the pin PWM. Then, the detection circuit 14 detects the pulse-width modulation signal received from the external pulse-width modulation circuit to determine whether or not the motor driver 1001 enters a temperature sensing mode to output a mode detecting signal.

The thermal sensor circuit 51 may determine, according to the mode detecting signal received from the detection circuit 14, whether or not the motor driver 1001 enters the temperature sensing mode, so as to further determine whether or not to sense the temperature inside the motor driver 1001, such as determining whether or not to sense temperatures of the control circuit 11, the driving circuit 12, and the output stage circuit 13 of the motor driving circuit 123, or regions surrounding the control circuit 11, the driving circuit 12, and the output stage circuit 13.

Under the temperature sensing mode, the thermal sensor circuit 51 of the motor driver 1001 senses the temperature inside the motor driver 1001. However, when not under the temperature sensing mode, the thermal sensor circuit 51 of the motor driver 1001 does not sense the temperature inside the motor driver 1001.

The external system circuit may, according to the temperature sensing signal from the thermal sensor circuit 51 of the motor driver 1001 that is connected to the external system circuit, determine whether or not the temperature inside the motor driver 1001 is greater than a threshold temperature when the motor driver 1001 is used to drive the motor MT (to rotate at a maximum speed), so as to evaluate whether or not the motor driver 1001 is applicable to the motor MT.

On the other hand, the frequency generating circuit 52 of the motor driver 1001 can generate a frequency signal according a frequency of the control signal that is output by the control circuit 11 or received by the driving circuit 12, and output the frequency signal to the external system circuit through one of the plurality of pins of the motor driver 1001 such as, but not limited to, the pin FG. Further, the frequency generating circuit 52 can output (according to indications of the external system circuit) a frequency signal to the driving circuit 12, and the driving circuit 12 operates according to the frequency signal.

Figure 2:
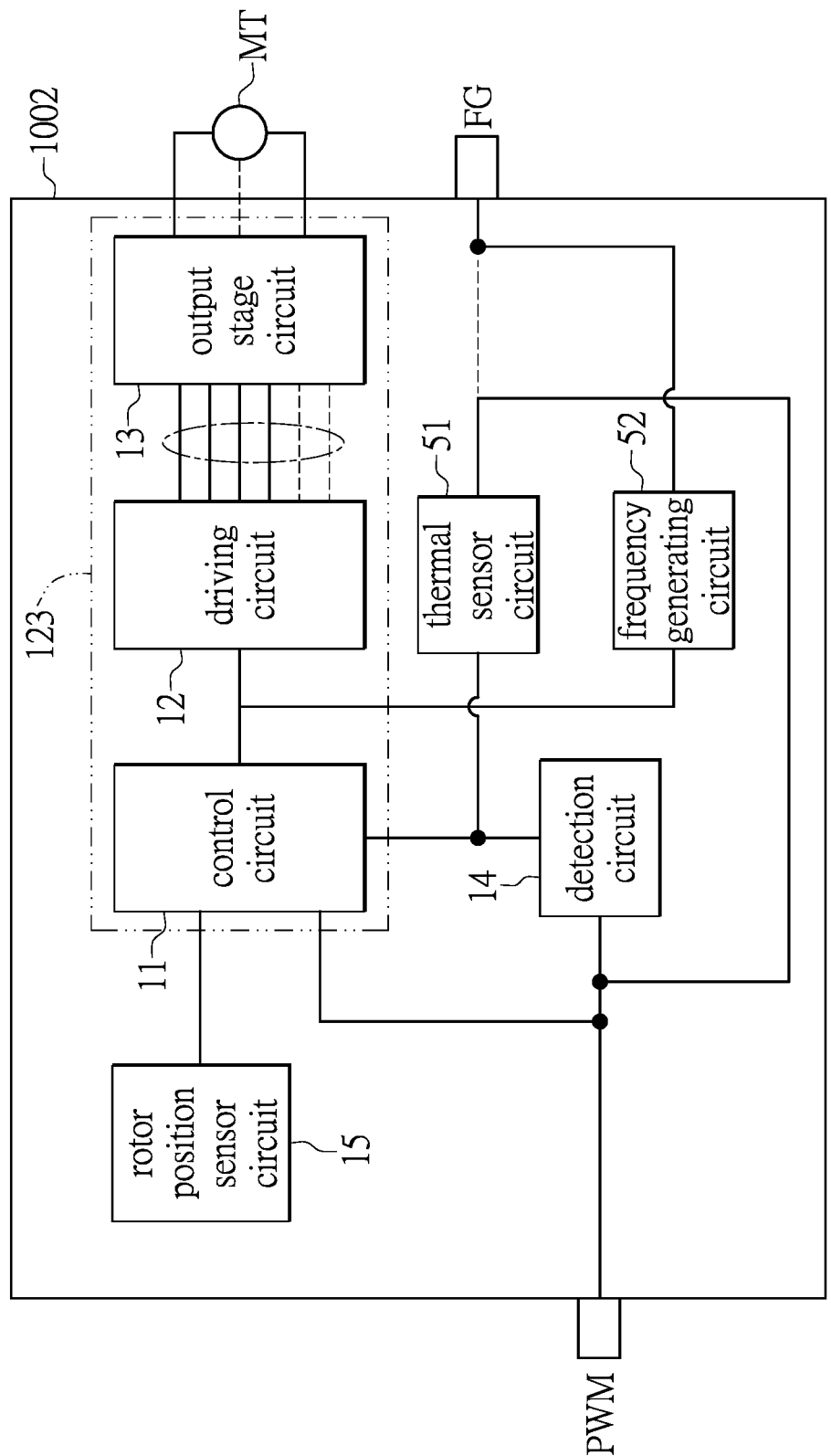
FIG. 2 is a functional block diagram of a motor driver having a temperature sensing mechanism according to a second embodiment of the present disclosure.

Reference is made to FIG. 2, in which FIG. 2 is a functional block diagram of a motor driver having a temperature sensing mechanism according to a second embodiment of the present disclosure. Similarities between the second embodiment and the first embodiment are omitted in the present disclosure.

Differences between the second embodiment and the first embodiment are described as follows.

As shown in FIG. 1, in the first embodiment, the control circuit 11 of the motor driver 1001 receives the pulse-width modulation signal from the external pulse-width modulation circuit through the pin PWM of the plurality of pins of the motor driver 1001, and the thermal sensor circuit 51 of the motor driver 1001 outputs the temperature sensing signal to an external system circuit through the pin FG that is another pin of the plurality of pins of the motor driver 1001.

In comparison, as shown in FIG. 2, in the second embodiment, the control circuit 11 receives the pulse-width modulation signal from the external pulse-width modulation circuit and the thermal sensor circuit 51 outputs the temperature sensing signal to the external system circuit through a same pin PWM of a plurality of pins of a motor driver 1002.

If necessary, in the second embodiment, the thermal sensor circuit 51 of the motor driver 1002 outputs the temperature sensing signal to an external system circuit or other external circuits through a pin FG that is another pin of the plurality of pins of the motor driver 1002.

The external system circuit may, according to the temperature sensing signal from the thermal sensor circuit 51 of the motor driver 1002 that is connected to the external system circuit, determine whether or not the temperature inside the motor driver 1002 is greater than a threshold temperature when the motor driver 1002 is used to drive the motor MT (to rotate at a maximum speed), so as to evaluate whether or not the motor driver 1002 is applicable to the motor MT.

Figure 3:
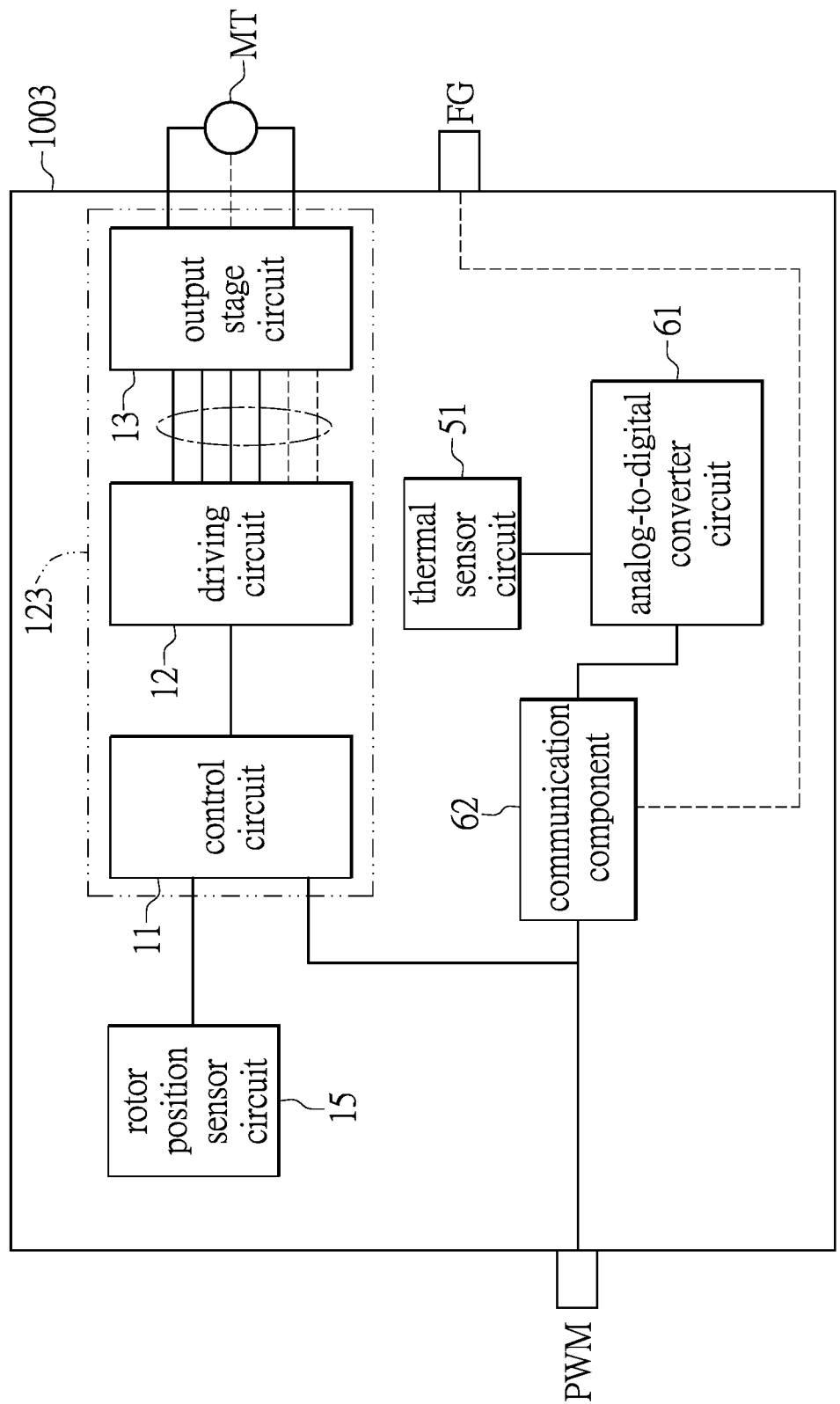
FIG. 3 is a functional block diagram of a motor driver having a temperature sensing mechanism according to a third embodiment of the present disclosure.

Reference is made to FIG. 3, in which FIG. 3 is a functional block diagram of a motor driver having a temperature sensing mechanism according to a third embodiment of the present disclosure.

A motor driver 1003 of the third embodiment of the present disclosure includes the motor driving circuit 123, the thermal sensor circuit 51, an analog-to-digital converter circuit 61, and a communication component 62. If necessary, the motor driver 1003 of the third embodiment of the present disclosure may further include the rotor position sensor circuit 15.

The motor driving circuit 123 may include the control circuit 11, the driving circuit 12, and the output stage circuit 13. The control circuit 11 is connected to the driving circuit 12. The driving circuit 12 is connected to the output stage circuit 13. The output stage circuit 13 is connected to the motor MT. The rotor position sensor circuit 15 may be disposed on the motor MT or adjacent to the motor MT, and may be connected to the control circuit 11.

The thermal sensor circuit 51 is disposed inside the motor driver 1003, and may be disposed adjacent to the motor driving circuit 123. The thermal sensor circuit 51 may be connected to the analog-to-digital converter circuit 61. The analog-to-digital converter circuit 61 is connected to the communication component 62.

It is worth noting that, the thermal sensor circuit 51 senses a temperature (of the motor driving circuit 123) inside the motor driver 1003. The analog-to-digital converter circuit 61 may convert the temperature sensing signal (output by the thermal sensor circuit 51) that is an analog signal into a digital signal to be taken as a digital temperature sensing signal.

The communication component 62 transmits the digital temperature sensing signal generated by the analog-to-digital converter circuit 61 to the external system circuit or other external circuits through one of the plurality of pins of the motor driver 1003 such as, but not limited to, the pin PWM, the pin FG, or through both of the pins PWM and FG.

In practice, the communication component 62 may also directly transmit the temperature sensing signal output by the thermal sensor circuit 51 to the external system circuit or other external circuits (through one of the plurality of pins of the motor driver 1003 such as, but not limited to, the pin PWM, the pin FG, or through both of the pins PWM and FG).

The external system circuit may, according to the temperature sensing signal from the thermal sensor circuit 51 of the motor driver 1003 that is connected to the external system circuit, determine whether or not the temperature inside the motor driver 1003 is greater than a threshold temperature when the motor driver 1003 is used to drive the motor MT (to rotate at a maximum speed), so as to evaluate whether or not the motor driver 1003 is applicable to the motor MT.

Figure 4:
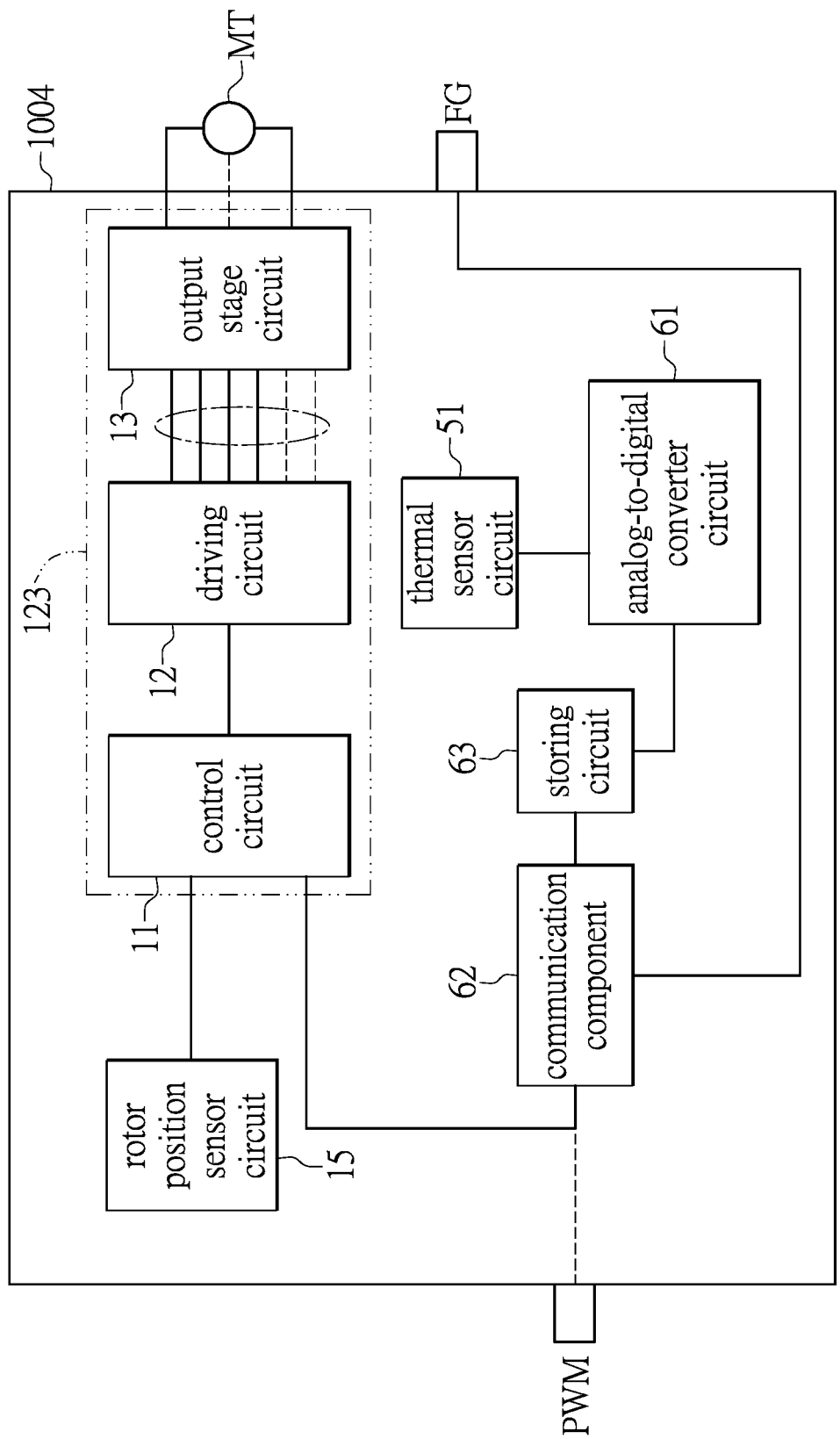
FIG. 4 is a functional block diagram of a motor driver having a temperature sensing mechanism according to a fourth embodiment of the present disclosure.

Reference is made to FIG. 4, in which FIG. 4 is a functional block diagram of a motor driver having a temperature sensing mechanism according to a fourth embodiment of the present disclosure. Similarities between the fourth embodiment and the third embodiment are omitted in the present disclosure.

One of the differences between the fourth embodiment and the third embodiment is that, a motor driver 1004 of the fourth embodiment further includes a storing circuit 63. The storing circuit 63 can be a register, but the present disclosure is not limited thereto.

The storing circuit 63 is connected to the analog-to-digital converter circuit 61 and the communication component 62.

The storing circuit 63 may store the digital temperature sensing signal generated by the analog-to-digital converter circuit 61 or the temperature sensing signal output by the thermal sensor circuit 51, or both of the digital temperature sensing signal and the temperature sensing signal.

The communication component 62 may transmit the digital temperature sensing signal or the temperature sensing signal, or both of the signals to the external system circuit through one of the plurality of pins of the motor driver 1004 such as, but not limited to, the pin PWM or the pin FG.

The external system circuit may, according to the temperature sensing signal from the thermal sensor circuit 51 of the motor driver 1004 that is connected to the external system circuit, determine whether or not the temperature inside the motor driver 1004 is greater than a threshold temperature when the motor driver 1004 is used to drive the motor MT (to rotate at a maximum speed), so as to evaluate whether or not the motor driver 1004 is applicable to the motor MT.

Figure 5:
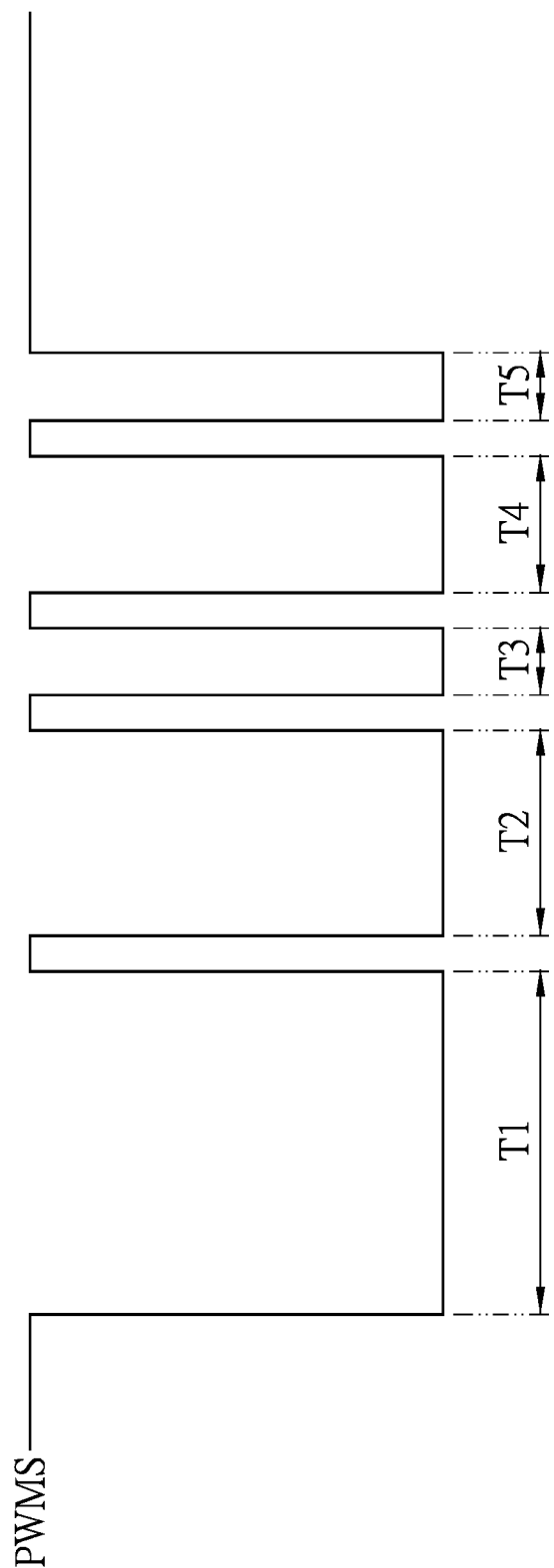
FIG. 5 is a waveform diagram of a pulse-width modulation signal detected by a motor driver having a temperature sensing mechanism according to a fifth embodiment of the present disclosure.

Reference is made to FIG. 5, in which FIG. 5 is a waveform diagram of a pulse-width modulation signal detected by a motor driver having a temperature sensing mechanism according to a fifth embodiment of the present disclosure.

When the detection circuit (such as the detection circuit 14 as shown in FIG. 1 or FIG. 2) of the motor driver (such as the motor driver 1001 as shown in FIG. 1 or the motor driver 1002 as shown in FIG. 2) of the present disclosure detects that a plurality of (consecutive) non-duty cycles of a designated number in a plurality of waveforms of a pulse-width modulation signal PWMS are respectively equal to a plurality of reference duty cycles, the detection circuit determines that the motor driver enters the temperature sensing mode.

In other words, a combination of a plurality of reference values (such as a plurality of duty cycles) is configured to be a code for the motor driver to enter the temperature sensing mode. When the detection circuit of the motor driver of the present disclosure detects that the pulse-width modulation signal PWMS contains a designated code consisting of a designated number of values (such as a plurality of non-duty cycles) in a designated sequence, the motor driver enters the temperature sensing mode.

For example, as shown in FIG. 5, when the detection circuit detects that five non-duty cycles T1, T2, T3, T4, and T5 of five consecutive waveforms in the plurality of waveforms of the pulse-width modulation signal PWMS are respectively equal to five reference duty cycles, the detection circuit determines that the motor driver enters the temperature sensing mode.

Conversely, when the detection circuit does not detect that the five non-duty cycles of five consecutive waveforms in the plurality of waveforms of the pulse-width modulation signal PWMS are respectively equal to the five reference duty cycles, the detection circuit determines that the motor driver does not enter the temperature sensing mode.

In short, the detection circuit determines whether or not to enter the temperature sensing mode according to the plurality of non-duty cycles in the plurality of waveforms of the pulse-width modulation signal PWMS that is received. In this example, the driving circuit (such as the driving circuit 12 as shown in FIG. 1 or FIG. 2) may determine a time for switching on a switching element of the output stage circuit (such as the output stage circuit 13 as shown in FIG. 1 or FIG. 2) according to the duty cycles of the pulse-width modulation signal PWMS.

Under the temperature sensing mode, the thermal sensor circuit (such as the thermal sensor circuit 51 as shown in FIG. 1 or FIG. 2) of the motor driver of the present disclosure senses the temperature inside the motor driver. However, when not under the temperature sensing mode, the thermal sensor circuit of the motor driver of the present disclosure does not sense the temperature inside the motor driver.

Figure 6:
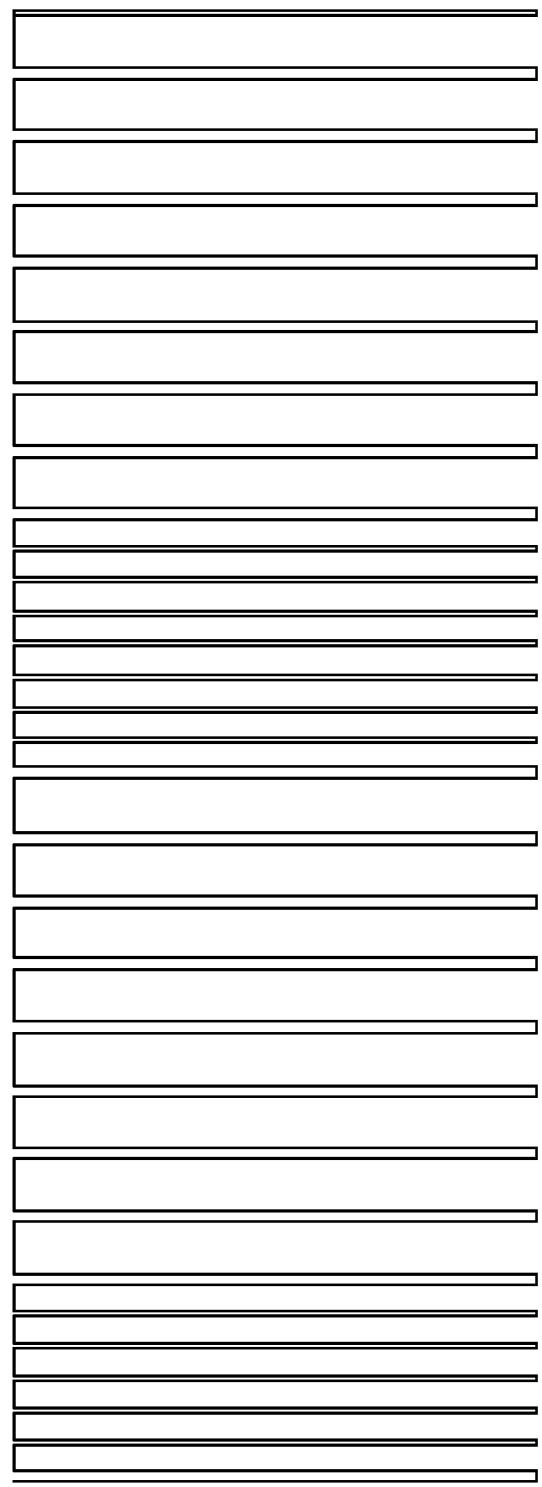
FIG. 6 is a waveform diagram of a pulse-width modulation signal detected by a motor driver having a temperature sensing mechanism according to a sixth embodiment of the present disclosure.

Reference is made to FIG. 6, in which FIG. 6 is a waveform diagram of a pulse-width modulation signal detected by a motor driver having a temperature sensing mechanism according to a sixth embodiment of the present disclosure.

When the detection circuit (such as the detection circuit 14 as shown in FIG. 1 or FIG. 2) of the motor driver (such as the motor driver 1001 as shown in FIG. 1 or the motor driver 1002 as shown in FIG. 2) of the present disclosure detects that a plurality of (consecutive) frequencies of a designated number in a plurality of waveforms of a pulse-width modulation signal PWMS2 are respectively equal to a plurality of reference frequencies, the detection circuit determines that the motor driver enters the temperature sensing mode.

In other words, a combination of a plurality of reference values (such as a plurality of reference frequencies) is configured to be a code for the motor driver to enter the temperature sensing mode. When the detection circuit of the motor driver of the present disclosure detects that the pulse-width modulation signal PWMS2 contains a designated code consisting of a designated number of values (such as a plurality of frequencies that are equal to the plurality of reference frequencies) in a designated sequence, the motor driver enters the temperature sensing mode.

For example, when the detection circuit detects that N frequencies of N consecutive waveforms in the plurality of waveforms of the pulse-width modulation signal PWMS2 are respectively equal to N reference frequencies that are different from each other (that is, the pulse-width modulation signal PWMS2 contains a code consisting of N designated frequency values combined according to a designated sequence), the motor driver enters the temperature sensing mode, in which N is an integer.

Conversely, when the detection circuit does not detect that the N frequencies of the N consecutive waveforms in the plurality of waveforms of the pulse-width modulation signal PWMS2 are respectively equal to the N reference frequencies that are different from each other, the detection circuit determines that the motor driver does not enter the temperature sensing mode.

Under the temperature sensing mode, the thermal sensor circuit (such as the thermal sensor circuit 51 as shown in FIG. 1 or FIG. 2) of the motor driver of the present disclosure senses the temperature inside the motor driver. However, when not under the temperature sensing mode, the thermal sensor circuit of the motor driver of the present disclosure does not sense the temperature inside the motor driver.

Figure 8:
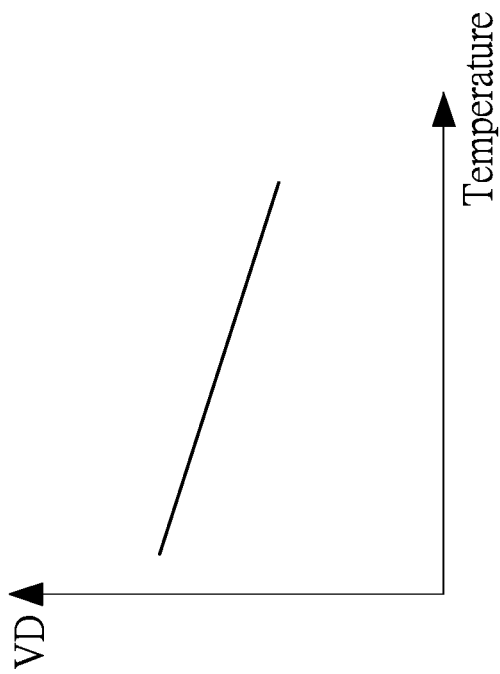
FIG. 8 is a curve diagram of voltages to temperatures of a diode in the thermal sensor circuit of the motor driver having a temperature sensing mechanism according to the seventh embodiment of the present disclosure.
Figure 7:
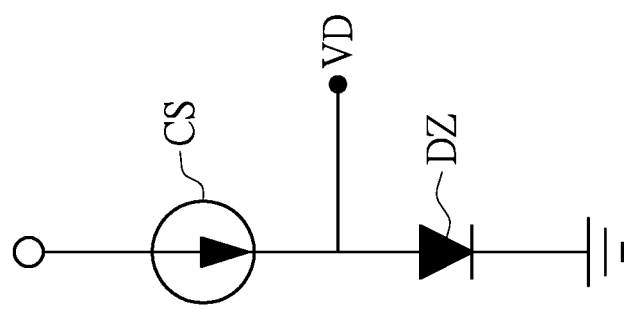
FIG. 7 is a circuit diagram of a thermal sensor circuit of a motor driver having a temperature sensing mechanism according to a seventh embodiment of the present disclosure.

Reference is made to FIG. 7 and FIG. 8, in which FIG. 7 is a circuit diagram of a thermal sensor circuit of a motor driver having a temperature sensing mechanism according to a seventh embodiment of the present disclosure, and FIG. 8 is a curve diagram of voltages to temperatures of a diode in the thermal sensor circuit of the motor driver having a temperature sensing mechanism according to the seventh embodiment of the present disclosure.

The thermal sensor circuit (such as the thermal sensor circuit 51 as shown in FIGS. 1 to 4) of the motor driver of the present disclosure may include a current source CS and a temperature change component. The current source CS is connected to a first terminal of the temperature change component. A second terminal of the temperature change component can be connected to a reference potential such as, but not limited to, a ground potential.

The current source CS provides an input current to the temperature change component for allowing the temperature change component to operate. The temperature change component senses the temperature inside the motor driver and outputs parameters of the temperature sensing signal that change along with changes in the temperature.

For example, as shown in FIG. 7, the temperature change component may include a diode DZ. An anode of the diode DZ is connected to the current source CS. A cathode of the diode DZ is grounded.

A voltage VD of the diode DZ is changed linearly and is inversely proportional to the changes in temperature. As shown in FIG. 8, the lower the temperature sensed by the diode DZ is, the higher the voltage VD of the diode DZ is. Conversely, the higher the temperature sensed by the diode DZ is, the lower the voltage VD of the diode DZ is.

Figure 10:
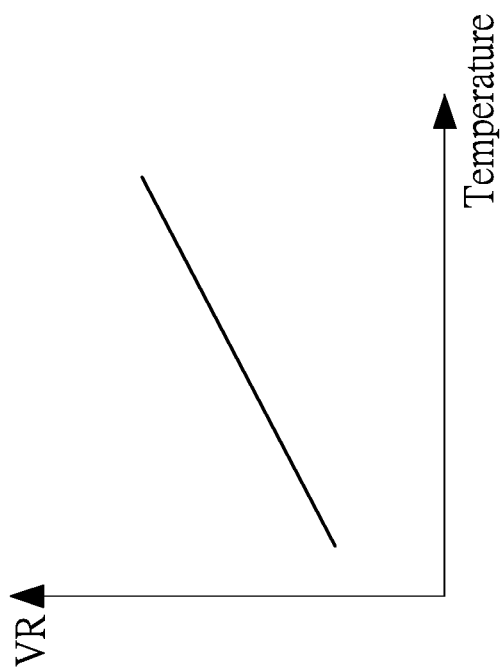
FIG. 10 is a curve diagram of voltages to temperatures of a thermistor in the thermal sensor circuit of the motor driver having a temperature sensing mechanism according to the eighth embodiment of the present disclosure.
Figure 9:
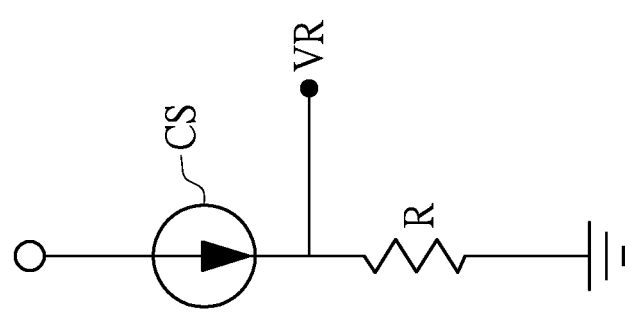
FIG. 9 is a circuit diagram of a thermal sensor circuit of a motor driver having a temperature sensing mechanism according to an eighth embodiment of the present disclosure.

Reference is made to FIG. 9 and FIG. 10, in which FIG. 9 is a circuit diagram of a thermal sensor circuit of a motor driver having a temperature sensing mechanism according to an eighth embodiment of the present disclosure, and FIG. 10 is a curve diagram of voltages to temperatures of a thermistor in the thermal sensor circuit of the motor driver having a temperature sensing mechanism according to the eighth embodiment of the present disclosure.

The thermal sensor circuit (such as the thermal sensor circuit 51 as shown in FIGS. 1 to 4) of the motor driver of the present disclosure may include a current source CS and a temperature change component. The current source CS is connected to a first terminal of the temperature change component. A second terminal of the temperature change component can be connected to a reference potential such as, but not limited to, a ground potential.

For example, as shown in FIG. 9, the temperature change component may include a thermistor R. A resistance of the thermistor R is changed in a manner that is linearly proportional to the changes in temperature. The lower the temperature sensed by the thermistor R is, the lower the resistance of the thermistor R is. Conversely, the higher the temperature sensed by the thermistor R is, the higher the resistance of the thermistor R is.

When the current source CS provides a constant input current, the resistance of the thermistor R is proportional to a voltage VR of the thermistor R. Therefore, as shown in FIG. 10, the lower the temperature sensed by the thermistor R is, the lower the voltage VR of the thermistor R is. Conversely, the higher the temperature sensed by the thermistor R is, the higher the voltage VR of the thermistor R is.

In conclusion, the present disclosure provides the motor driver having a temperature sensing mechanism. When the motor driver drives the motor to rotate in different rotational speeds, the motor driver senses temperatures of electrical components in the motor driver or surrounding regions thereof to provide the temperatures to the external system circuit for determining whether or not an overheating has occurred to the motor driver. Specifically, when the motor driver drives the motor to maintain rotation at a maximum speed, the external system circuit determines whether or not a temperature of the motor driver that is sensed exceeds a temperature that the motor driver can tolerate, so as to evaluate whether or not the motor driver (and the driving performed by the motor driver on the motor) is applicable to the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver having a temperature sensing mechanism, comprising:
   a motor driving circuit, including:
      a control circuit configured to determine a time for outputting a controlling signal according to a pulse-width modulation signal received from an external pulse-width modulation circuit connected to the control circuit;
      a driving circuit connected to the control circuit and configured to output a driving signal according to the controlling signal received from the control circuit; and
      an output stage circuit connected to the driving circuit and a motor, and configured to operate according to the driving signal received from the driving circuit to output an output stage signal to the motor to drive the motor to rotate; and
   a thermal sensor circuit connected to the control circuit and configured to sense a temperature of the motor driving circuit to output a temperature sensing signal;
   wherein the control circuit receives the pulse-width modulation signal from the external pulse-width modulation circuit through one of a plurality of pins of the motor driver, and the thermal sensor circuit outputs the temperature sensing signal to an external system circuit through the one or another one of the plurality of pins of the motor driver.

2. The motor driver according to claim 1, further comprising:
   a detection circuit connected to the thermal sensor circuit and configured to detect the pulse-width modulation signal received from the external pulse-width modulation circuit to determine whether or not the motor driver enters a temperature sensing mode to output a mode detecting signal, wherein the thermal sensor circuit determines whether or not to sense the temperature according to the mode detecting signal.

3. The motor driver according to claim 1, further comprising:
   a frequency generating circuit configured to determine a frequency of the controlling signal output by the control circuit connected to the frequency generating circuit to output a frequency signal to the external system circuit, or output another frequency signal to the driving circuit connected to the frequency generating circuit.

4. The motor driver according to claim 1, further comprising:
   an analog-to-digital converter circuit connected to the thermal sensor circuit and configured to convert the temperature sensing signal that is an analog signal into a digital signal to be taken as a digital temperature sensing signal.

5. The motor driver according to claim 1, wherein the thermal sensor circuit includes a current source and a temperature change component, the current source provides an input current to the temperature change component for allowing the temperature change component to operate, and the temperature change component senses the temperature and outputs parameters of the temperature sensing signal that change along with changes in the temperature.

6. The motor driver according to claim 1, further comprising:
   a rotor position sensor circuit connected to the control circuit and configured to detect a position of a rotor of the motor to output a position detection signal to the control circuit, wherein the control circuit determines a signal content of the controlling signal output to the driving circuit according to the position detection signal.

7. The motor driver according to claim 2, wherein the control circuit and the detection circuit receive the pulse-width modulation signal from the external pulse-width modulation circuit through the one of the plurality of pins of the motor driver.

8. The motor driver according to claim 2, wherein, when the detection circuit detects that a plurality of non-duty cycles of a designated number in a plurality of waveforms of the pulse-width modulation signal are respectively equal to a plurality of reference duty cycles, the detection circuit determines that the motor driver enters the temperature sensing mode.

9. The motor driver according to claim 2, wherein, when the detection circuit detects that a plurality of frequencies of a designated number in a plurality of waveforms of the pulse-width modulation signal are respectively equal to a plurality of reference frequencies, the detection circuit determines that the motor driver enters the temperature sensing mode.

10. The motor driver according to claim 3, wherein the frequency generating circuit outputs the frequency signal to the external system circuit through the another one of the plurality of pins of the motor driver.

11. The motor driver according to claim 4, further comprising:
    a communication component connected to the analog-to-digital converter circuit and configured to transmit the digital temperature sensing signal generated by the analog-to-digital converter circuit to the external system circuit.

12. The motor driver according to claim 5, wherein the temperature change component includes a diode having a voltage that changes along with changes in the temperature, or a thermistor having a resistance that changes along with changes in the temperature.

13. The motor driver according to claim 11, further comprising:

a storing circuit connected to the analog-to-digital converter circuit and the communication component, and configured to store the digital temperature sensing signal generated by the analog-to-digital converter circuit, wherein the communication component transmits the digital temperature sensing signal stored by the storing circuit to the external system circuit.

14. The motor driver according to claim 11, wherein the communication component transmits the digital temperature sensing signal to the external system circuit through the one of the plurality of pins of the motor driver.

15. The motor driver according to claim 11, wherein the communication component transmits the digital temperature sensing signal to the external system circuit through the another one of the plurality of pins of the motor driver.

* * * * *